(12) United States Patent
Källberg (10) Patent No.: US 8,099,133 B2
(45) Date of Patent: Jan. 17, 2012

(54) APPARATUS AND A METHOD FOR DIRECTING A RECEIVED SIGNAL IN AN ANTENNA SYSTEM

(75) Inventor: Daniel Källberg, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 395 days.

(21) Appl. No.: 12/527,769

(22) PCT Filed: Feb. 19, 2007

(86) PCT No.: PCT/SE2007/050095
§ 371 (c)(1),
(2), (4) Date: Aug. 19, 2009

(87) PCT Pub. No.: WO2008/103083
PCT Pub. Date: Aug. 28, 2008

(65) Prior Publication Data
US 2010/0029334 A1    Feb. 4, 2010

(51) Int. Cl.
*H04M 1/00* (2006.01)
(52) U.S. Cl. .................. 455/562.1; 455/561
(58) Field of Classification Search .......... None
See application file for complete search history.

(56) References Cited

U.S. PATENT DOCUMENTS

| 7,088,965 B1* | 8/2006 | Ngan ............ 455/114.2 |
| 2003/0036359 A1* | 2/2003 | Dent et al. ........ 455/63 |
| 2009/0061938 A1* | 3/2009 | Ulbricht et al. ....... 455/561 |

FOREIGN PATENT DOCUMENTS
EP    1 418 680 A1    5/2004

* cited by examiner

*Primary Examiner* — Erika Gary (57) ABSTRACT

The present invention relates to an antenna system (1), a method and an apparatus (20) for directing a received signal (RX), along selected signal path/paths (12, 13, 14, 15), such that the operation of any of the radio base stations (40, 50) in the antenna system (1) depends on the selected signal path/paths (12, 13, 14, 15). The antenna system (1) is comprised of a filter combiner (10) connected to radio base stations (40, 50) that are of different radio access networks. The apparatus (20) of the antenna system further comprises a duplex filter (21), coupled to the filter combiner (10), and adapted to receive/transmit signals of different access networks. The duplex filter (21) further comprises a transmitter filter (21a) and two receiver filters (21b, 21c). The receiver filters (21b and 21c) are further connected to a switch (22), said switch (22) is adapted to direct the received signal along one or several selected signal paths (12, 13, 14, 15) such that the operation of any of the radio base stations (40, 50) is dependent on which signal path/paths that is/are selected.

18 Claims, 7 Drawing Sheets

APPARATUS AND A METHOD FOR DIRECTING A RECEIVED SIGNAL IN AN ANTENNA SYSTEM

TECHNICAL FIELD

The present invention relates to antenna systems in general and to an apparatus and a method for directing a received signal in an antenna system in particular.

BACKGROUND

Today, radio base stations, (RBS) of mobile or radio telecommunication systems usually share the same antenna of an antenna system in order to minimize the visual impact on the site. This is also known as co-siting. The radio base stations may belong to different radio access networks such as the GSM system (Global System for Mobile Communications) and/or the wide band code division multiplexing (WCDMA) system. In addition to antenna-sharing, feeder-sharing has become more and more popular as it offers the possibility to reduce the number of cables and the number of electronics in the site. It is also possible to combine feeder sharing and antenna sharing when co-siting different access networks operating at different frequency bands e.g. GSM 1800 MHz and WCDMA 2100 MHz or different access networks operating at different frequencies within the same band, e.g. GSM 1900 MHz, WCDMA 1900 MHz. Usually, a filter combiner capable of both combining and separating signals, is connected to the co-sited radio base stations to enable feeder-sharing between two or several systems. A filter combiner is a radio frequency component that acts both as a duplex filter and/or as a diplex filter. The duplex filter may for example combine the transmit (TX) and receive (RX) signals of a specific frequency band into a common signal, whereas the diplex filter combines combined TX/RX signals from separate frequency bands into a common signal—for example, the TX/RX signals of GSM 900 MHz and 1800 MHz can be combined on a shared antenna feeder cable and split into separate signals at the top of the antenna mast. The diplex filter and the duplex filter are also capable in separating signals. An example of a traditional antenna system wherein two co-siting radio base stations share the same antenna and also share the same feeder (or filter combiner) is discussed below with respect to FIG. 1.

Figure 1:
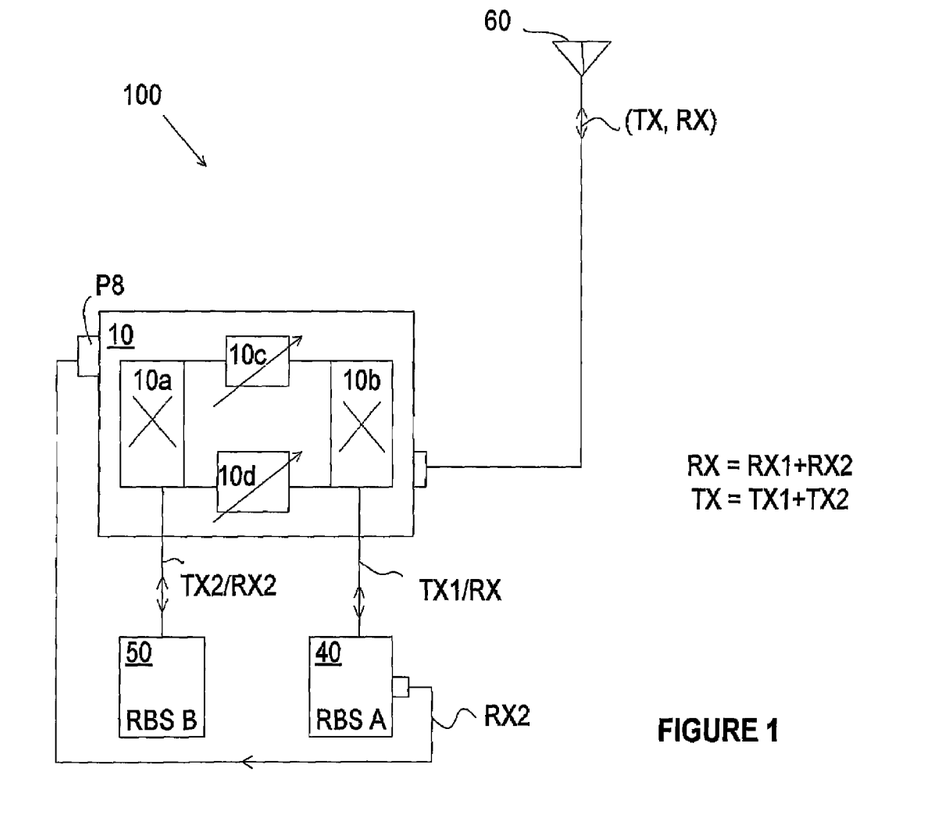
FIG. 1 is a schematic block diagram of prior art antenna system with two co-sited radio base stations.

Referring to FIG. 1 (Prior art), there is shown a block diagram of an antenna system 100 described in the international patent application WO 2006/121402. The antenna system 100 comprises two co-sited radio base stations 40 (RBS A) and 50 (RBS B) that are both connected to a filter combiner 10. The filter combiner 10 is further connected to an antenna 60. The radio base station 40 (RBS A) belongs to a first radio access network, e.g. GSM or WCDMA whereas the second radio base station 50 (RBS B) belongs to a second radio access network, e.g. WCDMA or GSM. As illustrated in FIG. 1. the antenna 60 is adapted to receive a signal RX which is a combination of a first receive signal RX1 and a second receive signal RX2. The first signal RX1 corresponds to a signal of a first radio access network, whereas the second signal RX2 corresponds to a signal of a second radio access network. The antenna 60 is also capable in transmitting a transmit signal TX being a combination of a first transmit signal TX1 and a second transmit signal TX2. The signal TX1 corresponds to a signal of a first radio access network whereas the signal TX2 corresponds to a signal of a second radio access network. As mentioned earlier, the filter combiner 10 is capable in separating the receive signal RX and the transmit signal TX. The filter combiner 10 also combines signals TX1 and TX2 prior to feeding the antenna 60. When a receive signal RX is received by the filter combiner 10 via antenna 60, the filter combiner 10 first feeds the first radio base station 40 (RBS A) with the RX signal. The radio base station 40 (RBS B) subsequently separates the RX signal into the RX1 and RX2 signals and feeds the second base station 50 (RBS B) with the RX2 signal via a port P8 of the filter combiner 10. The first radio base station 40 (RBS A) operates therefore as a master radio base station whereas the second radio base station 50 (RBS B) operates as a slave radio base station. This is because the filter combiner 10 is composed of two narrow band transmit filters, labelled 10c and 10d, which prevent the wide band RX signal to pass through the TX2/RX2 path. The narrow band is on the other hand tuneable in the wide band. It should be noted that the narrow and wide bands discussed above correspond to frequency bands or radio channels allocated to the systems in the site. As an example, two frequency bands, typically of 75 MHz each, are allocated to the GSM 1800 MHz system, whereas radio channels that are 5 MHz wide are allocated to the WCDMA system.

Referring back to FIG. 1, the radio base station 40 (RBS A) is, according to this prior art, forced to operate as a master radio base station because it must feed the slave radio base station 50 (RBS B) with the RX2 signal. The RX2 signal is prevented from passing any of the two narrow band filters 10c and/or 10d.

Tests performed at the site showed that in order to achieve as good performance as possible and to better deal with sensitivity issues of the co-siting systems, it is preferable to use the WCDMA radio base station as the master and the GSM radio base station as the slave. Therefore the radio base station 40 (RBS A) is, according to prior art, a WCDMA master radio base station. A drawback with this solution is that by using the WCDMA radio base station as the master base station, the spectrum utilization is greatly reduced because, as mentioned above, the WCDMA system only requires approximately 5 MHz of bandwidth.

An additional problem with the co-siting solution described above is that the radio base station 40 (RBS A) is forced to operate as a master, i.e. an operator can not use RBS B as a master by simply connecting the RF path TX2/RX2 to RBS A and the RF path TX1/RX to RBS B since this will reduce the operational performance of the site. In other words, simple switching of the RF paths may increase the interference between the two systems, and may also increase the unwanted emission generated from one system to the other. A solution to this problem would be to perform a complete new reconfiguration of the site, which most probably is an unfeasible solution to the operator of the site.

Yet another problem with the co-siting solution described above concerns the case where the operation of the master base station 40 (RBS A) is, for some reasons, interrupted. In such a case, the slave radio base station 50 (RBS B) is also affected since it can only transmit signals via the antenna 60 but is unable to receive signals until the master radio base station 40 (RBS B) is repaired or replaced.

SUMMARY

As stated above, several problems arise in a co-siting antenna system where a radio base station is initially forced to be a master base station to another radio base station, and therefore there is a need for a solution that makes it possible to direct the RX signal along one or several selected signal paths whereby the operations of the radio base stations are dependent on the selected signal path/paths.

According to a first aspect of the present invention, the above stated problems are solved by means of an apparatus adapted to be connected to an antenna of an antenna system comprising a filter combiner which in turn is connected to a first radio base station and to at least a second radio base station. The apparatus according to the present invention comprises a duplex filter, coupled to the filter combiner, and adapted to receive and transmit signals of different access networks. The duplex filter comprises a first receiver filter and at least a second receiver filter. The apparatus further comprises a switch that is connected to the duplex filter, and that is adapted to direct a received signal RX, along at least one selected signal path, whereby the operation of the first and the second radio base stations is dependent on the selected signal path/paths.

According to a second aspect of the present invention, the above stated problems are solved by means of an antenna system comprising a filter combiner that is connected to at least a first radio base station of a first radio access network and to a second radio base station of a second radio access network. The antenna system further comprises an apparatus comprised of a duplex filter connected to a switch; said switch is adapted to direct a received signal, along at least one selected signal path, such that the operation of the first and second radio base station is dependent on the selected signal path/paths.

According to a third aspect of the present invention, the above stated problem is solved by means of a method for directing a received signal along at least one signal path, in an antenna system comprising a first radio base station and at least a second radio base station that are both connected to a filter combiner. The method according to the present invention comprises the steps of: providing a received signal to a first receiver filter of a duplex filter, wherein the received signal is composed of a first signal according to a first access network and of a second signal according to a second access network; providing the received signal to a switch that is connected to the duplex filter; directing, by the switch, the received signal, along at least one selected signal path; and operating the first and second radio base stations depending on the selected signal path/paths.

An advantage with the present invention is that the frequency spectrum utilization at an antenna system is enhanced.

Another advantage with the present invention is that any radio base station of the antenna system may be selected to be the master radio base station without significant operational performance deterioration.

Another advantage with the present invention is that configuration and/or reconfiguration of the antenna system is much easily achieved even when new systems are introduced in the antenna system.

Yet another advantage with the present invention is that redundancy at the antenna system is possible without significant performance degradation.

Other advantages of the present invention will become apparent from the following detailed description, when considered in conjunction with the accompanying drawings, attention to be called to the fact, however, that the following drawings are illustrative only, and that changes may be made in the specific embodiments illustrated and described within the scope of the appended claims.

DETAILED DESCRIPTION

References will now be made in details to the exemplary embodiments of the present invention, examples of which are illustrated in the accompanying drawings. Wherever possible, the same reference numbers will be used throughout the drawings to refer to the same or like parts.

The present invention provides an apparatus, a system and a method for directing the RX signal along one or several selected signal paths such that the operation of the radio base stations of the antenna system are dependent on the selected signal path/paths. In addition the present invention enhances the spectrum utilization at the site since it enables a network operator to let radio base stations make use of their allocated frequency bands. Furthermore, the present invention provides redundancy in the network without significantly degrading the performance of the system.

As previously described, the radio base station 40 (RBS A) illustrated in the prior art system of FIG. 1, must operate as a master radio base station which means that it provides the slave radio base station 50 (RBS B) with the received signal RX2 via port P8 of the filter combiner 10 and through the RF path TX2/RX2. In the transmission state, the master radio base station 40 (RBS B) sends it transmit signal TX1 to the filter combiner 10 and the slave base station 50 (RBS B) sends it transmit signal TX2 to the filter combiner 10. The filter combiner 10 subsequently combines the two transmit signals TX1 and TX2 into a transmit signal TX which in turn is fed to the antenna 60.

As depicted in FIG. 1, the filter combiner 10 is composed of a first hybrid 10a, a second hybrid 10b and two narrow band filters 10c and 10d. The hybrid is also known as a 3 dB directional coupler as it divides the input signal or the input power equally between output ports. A detailed description of the filter combiner 10 can be found in the international patent application WO 2006/121402.

Figure 2:
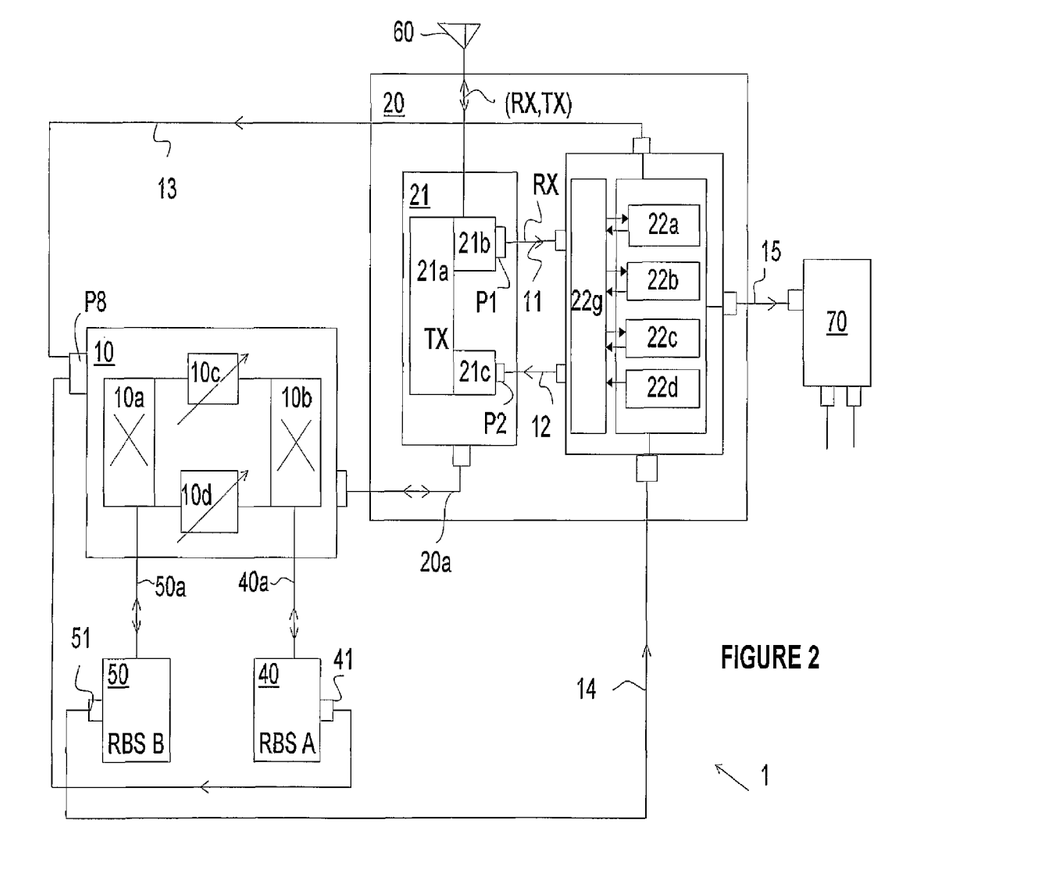
FIG. 2 is a schematic block diagram of an antenna system with two co-sited radio base stations, according to a general embodiment of the present invention.

FIG. 2 illustrates a schematic block diagram of an antenna system 1 according to a general embodiment of the present invention. The antenna system 1 comprises two co-sited radio base stations 40 and 50 (RBS A and RBS B) that are both connected to a filter combiner 10 via a first receive/transmit cable 40a and a second receive/transmit cable 50a. The filter combiner 10 is similar to the combiner described earlier. As depicted in FIG. 2, the filter combiner 10 is further connected, via a receive/transmit cable or signal branch 20a, to an apparatus 20 according to the present invention, which in turn is coupled to an antenna 60 using a transmit/receive cable or signal branch labelled (RX, TX). In addition, the apparatus 20 is adapted to be connected to an external radio frequency component, RF component, 70. The RF component 70 could be a splitter, a diplexer, an amplifier, a RF booster, a hybrid, a low noise amplifier (LNA) etc. It should be noted that the present invention is not in any way restricted to above mentioned RF components.

As shown in FIG. 2, apparatus 20 is, according to the present invention, comprised of at least a duplex filter 21 that is composed of a transmitter filter 21a and of two receiver filters 21b and 21c. The transmitter filter 21a is adapted to send a transmit signal TX via the antenna 60. The transmit signal TX is composed of two transmit signals TX1 and TX2, where TX1 corresponds to a transmit signal according to a first radio access network, and TX2 corresponds to a transmit signal according to a second radio access network. As an example, the first radio access network may be a WCDMA network whereas the second access network may be a GSM network.

The receiver filter 21b of apparatus 20 is adapted to receive a receive signal RX which is a combination of a first receive signal RX1 of a first access network, and of a second receive signal RX2 of a second access network. The receiver filter 21c on the other hand is adapted to receive the receive signal RX2 either from the switch 22 or from the radio base station 50 (RBS B), as will be exemplified later.

In addition to the duplex filter 21, apparatus 20 further comprises a switch 22 that is connected to the duplexer filter 21a via a port P1 of the receiver filter 21b and via a port P2 of the receiver filter 21c. The signal paths connecting the switch 22 to the duplex filter 21 are labelled 11 and 12 respectively. As shown in FIG. 2, the switch 22 is further coupled to the filter combiner 10 via a receiver slave port P8 of the filter combiner. The switch 22 is also connected to the radio base station 50 (RBS B) via a port 51 of the base station. The signal paths connecting the switch 22 to the filter combiner 10 and to the radio base station 50 (RBS B) are labelled 13 and 14 respectively. The signal path labelled 15 in FIG. 2 refers to the path connecting the switch 22 to the external RF component 70. As will be explained and illustrated, the switch 22 is, according to the present invention, adapted to direct the RX signal received from port P1, along selected signal path/paths 12, 13, 14, 15, depending on which control functional block 22a, 22b, 22c, 22d that is selected in the switch 22. The selection is performed at a functional switching block 22g.

Hereinafter each functional block 22a, 22b, 22c and 22d of apparatus 20 is, in accordance with the present invention, described and illustrated with reference to FIGS. 3A, 3B, 3C, and 3D respectively.

Figure 3A:
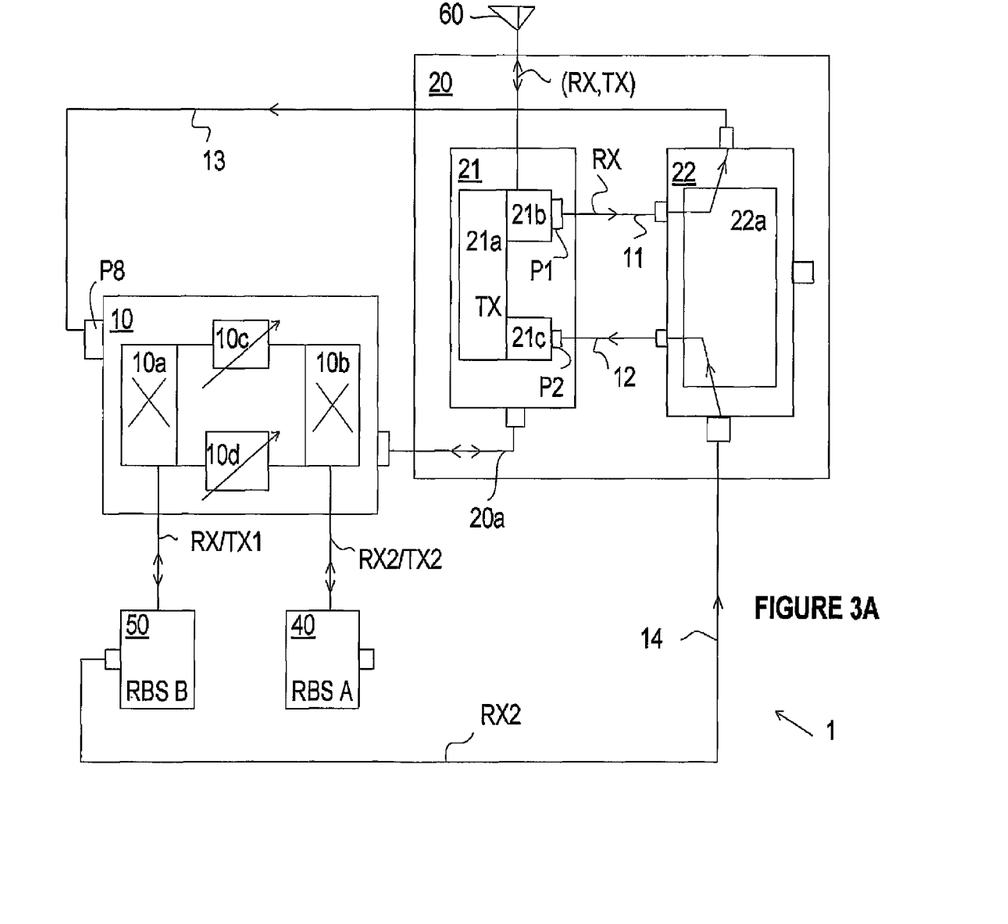
FIG. 3A is a schematic block diagram of first structure of an apparatus in an antenna system according to an embodiment of the present invention.

Referring to FIG. 3A, there is illustrated a schematic block diagram of an antenna system 1, according to an exemplary embodiment of the present invention. According to this embodiment, the radio base station 50 (RBS B) is a master WCDMA radio base station whereas the radio base station 40 (RBS A) is as a slave GSM radio base station. As illustrated, apparatus 20 is adapted to receive the RX signal via the receiver filter 21b which in turn passes the signal RX via port P1, along the signal path 11, to the switch 22. The switch 22 of apparatus 20 is further adapted to direct, in a first functional block 22a, the RX signal, along a selected first signal path 13, to the receiver slave port P8 of the filter combiner 10. The filter combiner 10 then passes the received signal RX to the radio base station 50 (RBS B) which subsequently separates the RX signal into signal components RX1 and RX2. The radio base station 50 (RBS B) is thus acting as a master radio base station since it feeds, along a selected second signal path 14, the radio base station 40 (RBS B) with the RX2 signal. Note that in the transmission state, the frequency spectrum utilization is enhanced since the GSM radio base station 40 (RBS A), although being the slave radio base station, makes use of its allocated frequency band of e.g 75 MHz. In other words, the GSM radio base station 40 (RBS A) utilizes the wider TX1 frequency band as the transmitted signal does not pass the narrow band filters 10c and/or 10d.

It should be noted that the operational performance of the antenna system still achieves a good performance since the WCDMA radio base station 50 (RBS B) is operating as the master radio base station and thus sensitivity issues of the co-sited base stations are not affected.

Figure 3B:
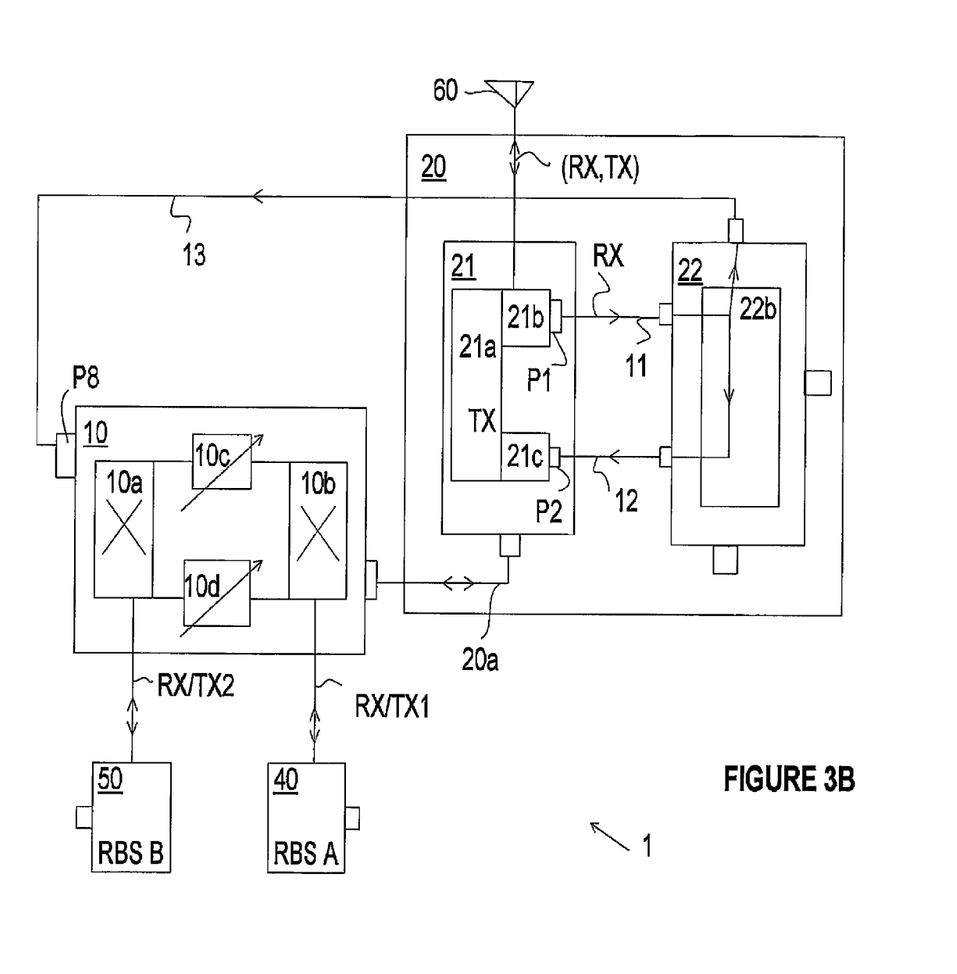
FIG. 3B is a schematic block diagram of a second structure of an apparatus in an antenna system according to an embodiment of the present invention.

Referring to FIG. 3B, there is illustrated another schematic block diagram of an antenna system 1, according to another exemplary embodiment of the present invention. According to this embodiment, neither the radio base station 50 (RBS B) nor the radio base station 40 (RBS A) operate as a master base station. Instead, the filter combiner 10 feeds both radio base stations with the RX signal. This is achieved using a second functional block 22b of the switch 22 of apparatus 20. As illustrated in FIG. 3B, the received signal RX is, after passing the duplex filter 21, split in the functional block 22b using a 3 dB splitter. A 3 dB splitting of the signal RX means that the signal is equally divided into two identical signals RX. The split signal RX is further transmitted, along the first signal path 13 and a third signal path 12 to the filter combiner 10. The filter combiner then feeds both radio base stations 40 (RBS A) and 50 (RBS B) with the RX signal.

Thus, in this scenario, the switch 22 of apparatus 20 directs, along signal paths 12 and 13, the received signal RX in such a way that the radio base stations 40 (RBS A) and 50 (RBS B) operate independently of each other. This configuration is useful when e.g. a tower mounted amplifier is connected to the antenna system 1, such that a splitting of the RX signal in apparatus 20 does not substantially degrade the operational performance of the site.

Figure 3C:
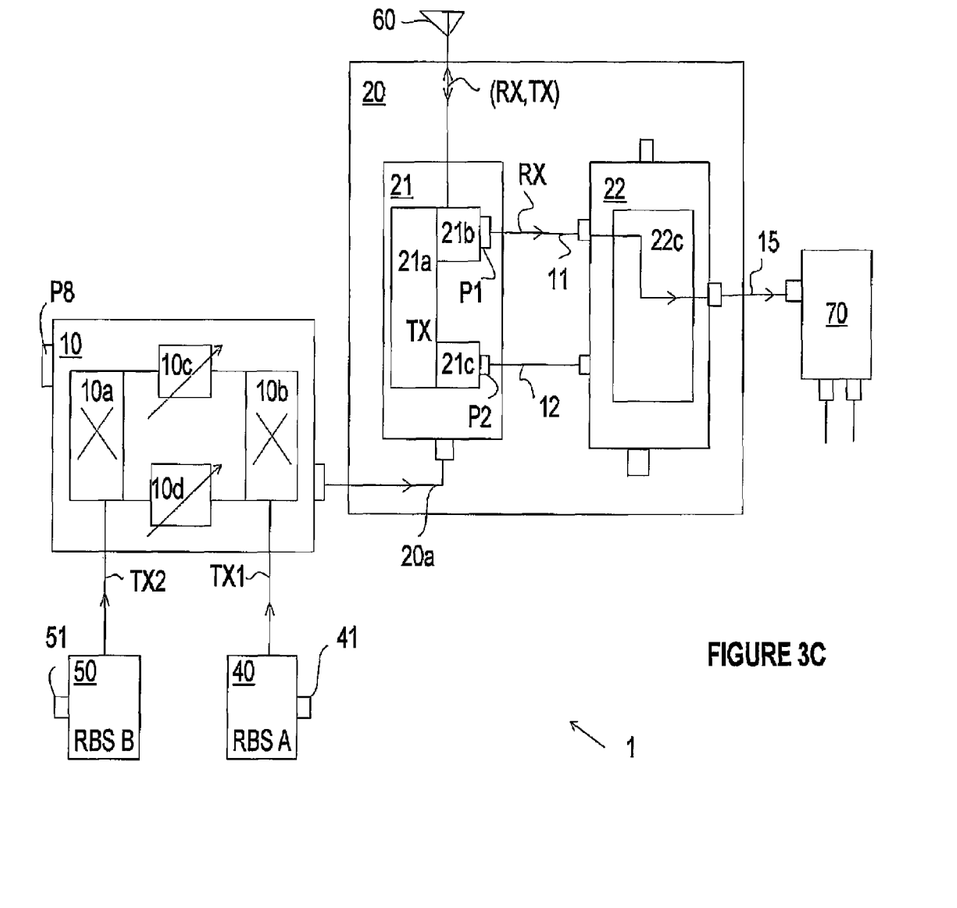
FIG. 3C is a schematic block diagram of a third structure of an apparatus in an antenna system according to an embodiment of the present invention.

Referring to FIG. 3C, there is illustrated another schematic block diagram of an antenna system 1, according to yet another exemplary embodiment of the present invention. According to this exemplary embodiment, an external radio frequency component 70 is connected, along a fourth signal path 15, to the switch 22. As illustrated, the RX signal received in a third functional block 22c of the switch 22, is routed to the external frequency component 70 along the selected signal path 15. In such a scenario, the radio base stations 40 and 50 both operate as transmitters only. This scenario enables, for example, an operator to connect one or several radio base stations or one or several amplifiers to the radio frequency component 70 and use apparatus 20 as a signal feeder.

Note that the radio base stations 40 and 50 may also operate as slaves by connecting a master radio base station to the radio frequency component 70. The master base station may thus feed the radio base station 40 via port 41 and the radio base station 50 via port 51.

Figure 3D:
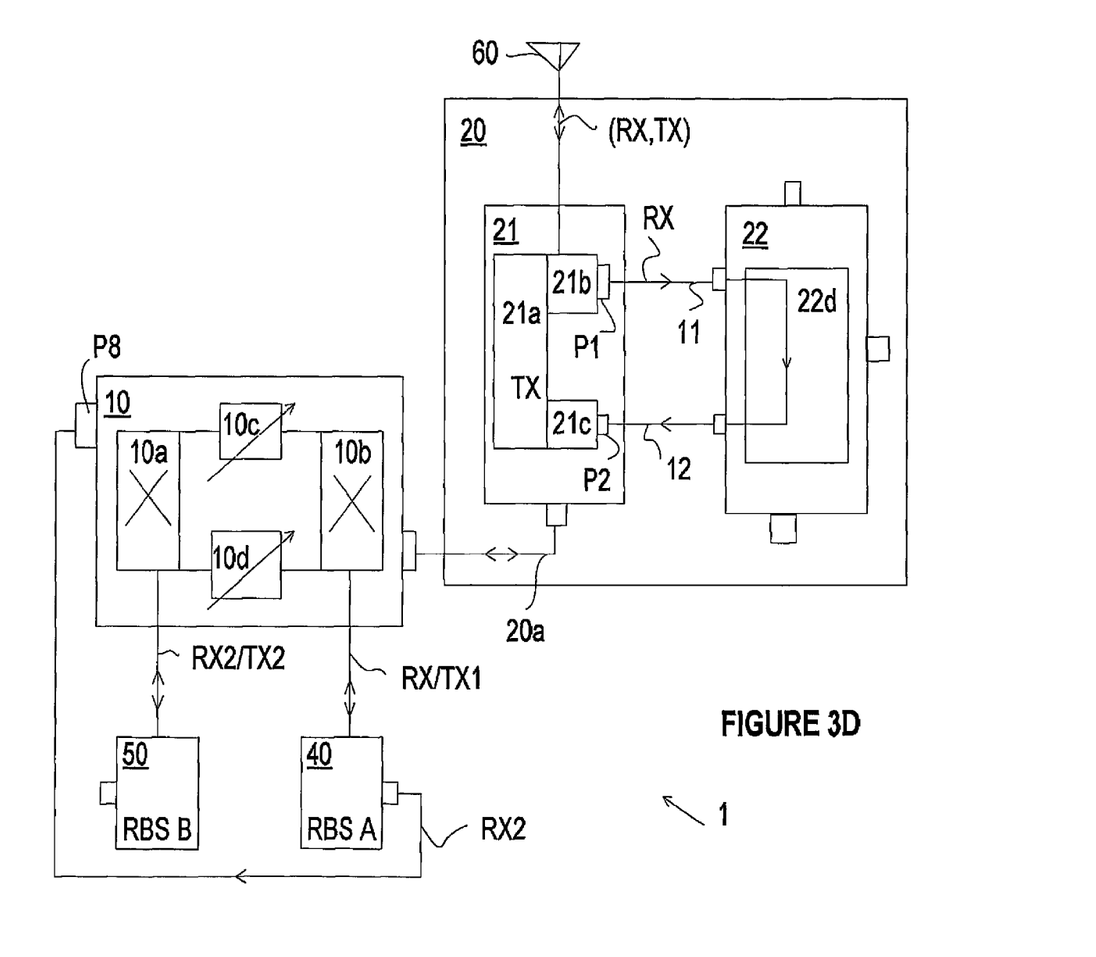
FIG. 3D is a schematic block diagram of a fourth structure of an apparatus in an antenna system according to an embodiment of the present invention.

Referring to FIG. 3D, there is illustrated yet another schematic block diagram of an antenna system 1. According to this exemplary embodiment of the present invention, the switch 22 of apparatus 20 is adapted to direct, in a fourth functional block 22d, the RX signal along the selected third signal path 12, to the first radio base station 40 (RBS A). The radio base station 40 (RBS B) then separates the receive signal RX and feeds the radio base station 50 with the RX2 signal. Note that the scenario depicted in FIG. 3D, the radio base station 40 is a WCDMA master radio base station, whereas the radio base station 50 is a GSM slave radio base station.

Referring back to FIG. 2, all four functional blocks 22a, 22b, 22c, and 22d of apparatus 20 described above in conjunction with FIGS. 3A-3D. are combined together in the single switch 22 of apparatus 20. It is thus possible to select any of the blocks 22a-22d using the functional switching block 22g that is incorporated in the switch 22. This way, the switch 22 may direct the received signal (RX) along one or several selected paths 12, 13, 14, 15 such that the operation of the radio base stations depends on the selected signal path/paths.

It should be noted that redundancy is easily achieved, in the antenna system 1, depending on the selected operation of the radio base stations because an operator may choose which radio base station is to operate as a master or as a slave by controlling the path/paths along which the receive signal RX is to follow. This redundancy is especially important if a malfunction of any of the radio base stations is detected. In such a case, an operator may configure/reconfigure the antenna system such that the operational performance of the antenna system is not jeopardized.

According to the present invention, the selection and the control of the functional blocks in the switch maybe performed remotely, mechanically and/or automatically. As an example, a remote control may be achieved using control signals in accordance with the Antenna Interface Standard group protocol, AISG, and/or the Ericsson Remote Tilt protocol, RET, and/or the Ericsson Tower Mounted Amplifier control protocols. The protocols mentioned above are well known to facilitate the introduction of antenna line products with remote control and monitoring facilities, and aim to ensure basic interoperability of antennas and control infrastructure as described in "*AISG Standard No. AISG V2.0*" 13$^{th}$, June 2006.

Figure 4:
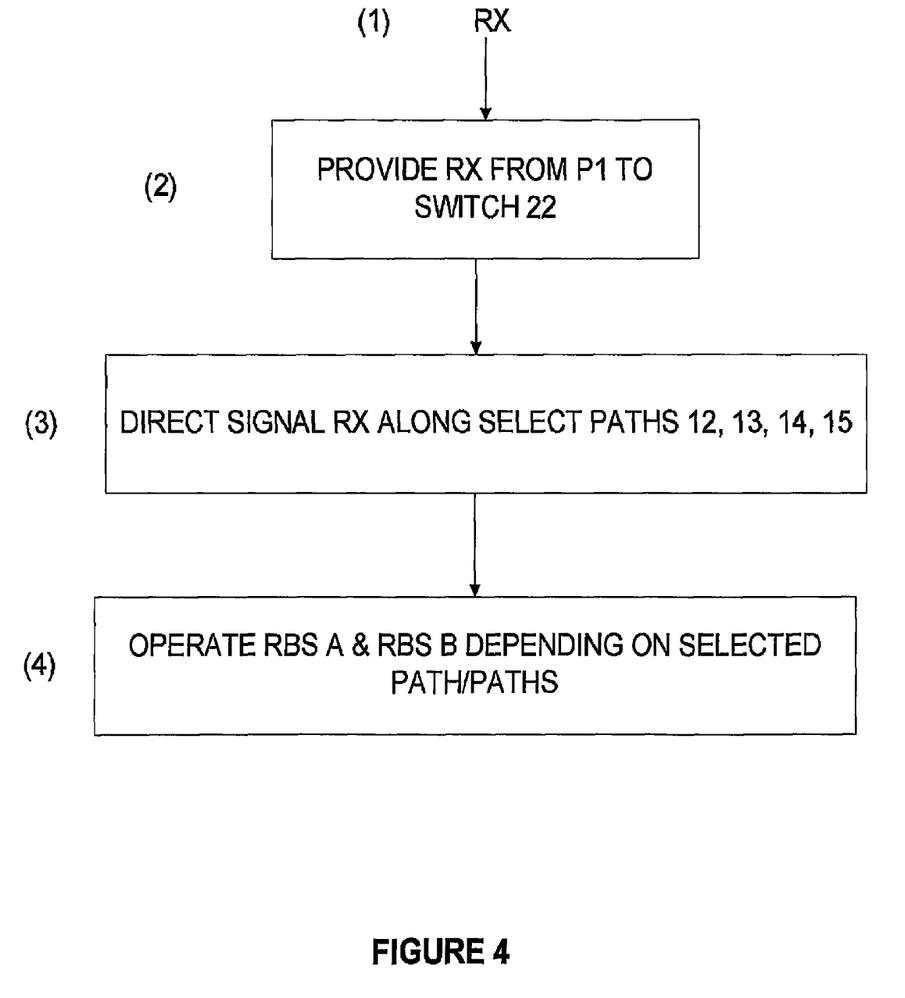
FIG. 4 is a flowchart of a method for directing a received signal, along selected signal paths according to the present invention.

FIG. 4 illustrates a flowchart of a method, in accordance with the present invention, for directing a signal RX received by an antenna 60 of an antenna system 1, along one or several selected signal paths 12, 13, 14, 15, such that the operation of a first radio base station 40 (RBS A) and at least a second radio base station 50 (RBS B) depends on the selected signal path/paths 12, 13, 14, 15. The radio base stations 40 (RBS A) and 50 (RBS B) are both connected to a filter combiner 10 of the antenna system 1.

The method according to the present invention comprises the followings steps:

At step 1, a received signal RX is provided to a receiver filter 21b of a duplex filter 21, wherein the received signal RX is composed of a first receive signal RX1 of a first radio access network and of a second receive signal RX2 of a second radio access network.

At step 2, the received signal RX is further provided to a switch 22 connected to the duplex filter 21.

At step 3, the switch 22 directs the received signal RX along at least one selected signal path 12, 13, 14, 15.

At step 4, the operation of the first radio base station 40 (RBS A) and/or the second radio base station 50 (RBS B) is determined based on the selected signal path/paths 12, 13, 14, 15, i.e. the operation of the base stations 40 and 50 depends on the selected signal path/paths.

According to an embodiment of the present invention, the method described above further comprises, directing (22a) the received signal RX, along a selected first signal path 13, to a receiver slave port P8 of a filter combiner 10, such that the second radio base station 50 (RBS B), when receiving the signal RX via the filter combiner 10, operates as a master radio base station thereby feeding, along a selected second signal path 14, the first radio base station 40 (RBS A) with a receive signal RX2.

According to another embodiment of the present invention, the method described above further comprises, performing a 3 dB splitting (22b) of the received signal RX at the switch 22, and directing the split signal RX, along both a selected third signal path 12 and the selected first signal path 13, to the received slave port P8 of the filter combiner 10 and to the second port P2 of the receiver filter P2, such that both radio base stations 40 (RBS A) and 50 (RBS B) receive the split signal RX.

According to another embodiment of the present invention, the method described above further comprises directing (22c) the received signal RX, along a selected fourth signal path 15, to an external radio frequency component 70 connected to the switch 22.

According to yet another embodiment of the present invention, the method described above comprises: directing (22d) the received signal RX, along the selected third signal path 12 to the second port P2, such that the first radio base station 40 (RBS A), when receiving the signal RX via the filter combiner 10, operates as a master radio base station thereby feeding the second radio base station 50 (RBS B), via the filter combiner 10, with the second signal RX2.

According to a further embodiment of the present invention, the above described method further comprises remotely, mechanically and/or automatically controlling the receive signal RX by the switch using control signals in accordance with any of the above mentioned protocols.

A person skilled in the art appreciates that the present invention can be realised in many ways. As an example, the splitting of the RX signal is not restricted to a 3 dB splitting i.e. any appropriate splitting could be performed. Furthermore, one or several filter combines may be connected in parallel to facilitate the introduction of additional radio base stations in the antenna system.

The present invention is therefore not restricted to the block diagrams illustrated in the previously described figures. In addition, the apparatuses according to the present invention can be realised in hardware with means of digital circuits and as software in a signal processing circuit. Furthermore, the RF component connected to the switch might be an active RF component, or a passive RF component, and the antenna system may be adapted for use in telecommunications systems such as the JDC (Japanese Digital Cellular), GSM (Global System for Mobile Communications), GPRS General Packet Radio Service), EDGE (Enhanced Data rates for GSM Evolution), WCDMA (Wide band Code Division Multiplexing Access), CDMA (Code Division Multiplex Access), GPS (Global Positioning System), and the WIMAX (Worldwide Interoperability for Microwave Access)

While the invention has been described in terms several embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. An apparatus adapted to be connected to an antenna of an antenna system, wherein the antenna system comprises a filter combiner connected to a first radio base station and to at least a second radio base station, said apparatus comprising:

a duplex filter, coupled to said filter combiner, said duplex filter is adapted to receive and transmit signals of different access networks, wherein the duplex filter comprises a first receiver filter and at least a second receiver filter;

a switch adapted to be connected to the duplex filter, wherein the switch is further adapted to direct a received signal along at least one selected signal path, whereby the operation of said first and second radio base stations is dependent on said at least one selected signal path.

2. The apparatus according to claim 1 wherein said duplex filter is connected to said switch via a first port and via a second port, and wherein said received signal is initially received by said first received filter of said duplex filter.

3. The apparatus according to claim 1 wherein said switch is further connected to both a receiver slave port of said filter combiner and to an interface of said second radio base station.

4. The apparatus according to claim 1, wherein said received signal is composed of a first signal of a first access network and a of second signal of a second access network and wherein the duplex filter is further adapted to transmit a transmit signal composed of first transmit signal of a first access network and of a second transmit signal of a second access network.

5. The apparatus according to claim 1 wherein said switch is further adapted to direct in a first functional block, the received signal, along a selected first signal path, to said receiver slave port of the filter combiner, such that the second radio base station when receiving the signal via the filter combiner, operates as a master radio base station.

6. The apparatus according to claim 5 wherein said switch is further adapted to direct the second signal received from the master radio base station, along a selected second signal path, to the first radio base station via the second port of the duplex filter and via the filter combiner.

7. The apparatus according to claim 1 wherein said switch is further adapted to perform a 3dB splitting of the received signal in a second functional block, and further direct the split signal, along both the selected first signal path and a selected third signal path, to the receiver slave port of the filter combiner and to the second port of the second receiver filter such that both radio base stations receive the split signal.

8. The apparatus according to claim 1 wherein said switch is further adapted to direct in a third functional block, the received signal, along a selected fourth signal path, to an external radio frequency component, RF component, that is connected to the switch, such that said apparatus feeds other RF components that are connected to said RF component.

9. The apparatus according to claim 1 wherein said switch is further adapted to direct in a fourth functional block, the received signal, along the selected third signal path, to the second port of the second receiver filter, such that the first radio base station when receiving the signal via the filter combiner, operates as a master radio base station thereby feeding the second radio base station via said filter combiner, with the second signal.

10. The apparatus according to claim 1 wherein said switch is further adapted to switch in a functional switching block the received signal to a selected functional block such the received signal is directed along at least one selected signal path, whereby the operation of said first and second radio base stations are dependent on the selected functional block.

11. The apparatus of claim 1, wherein said apparatus is further connected to a filter combiner of an antenna system, said antenna system comprising the filter combiner that is connected to at least a first radio base station of a first radio access network and to at least a second radio base station of a second radio access network.

12. The antenna system according to claim 11 wherein said filter combiner comprises at least a first directional coupler and a second directional coupler that are connected to at least two narrow band filters and wherein the first directional coupler is adapted to be connected to said first radio base station via a first signal branch and wherein the second directional coupler is adapted to be connected to said second radio base station (50) via a second signal branch.

13. The antenna system according to claim 12 wherein said second directional coupler is further connected to said apparatus via a third signal branch, and wherein said antenna system further comprises an antenna that is connected to said apparatus.

14. A method for directing a received signal along at least one selected signal path in an antenna system comprising a first radio base station and at least a second radio base station that are both connected to a filter combiner, wherein said method comprises the steps of:
providing a received signal to a receiver filter of a duplex filter, wherein said received signal is composed of a first signal of a first access network and of a second signal of a second access network;
providing said received signal to a switch;
directing, by the switch, the received signal, along at least one selected signal path; and
operating said first radio base station and/or said second radio base station based on the selected signal path/paths.

15. The method according to claim 14 wherein said step of directing comprises directing the received signal, along a selected first signal path, to a receiver slave port of the filter combiner, such that the second radio base station when receiving the signal via the filter combiner, operates as a master radio base station thereby feeding, along a selected second signal path, the first radio base station via said filter combiner, with the second signal.

16. The method according to claim 14 wherein said step of directing further comprises 3dB splitting the received signal and directing the split signal, along both a selected third signal path and the selected first signal path, such that both radio base stations receive the split signal.

17. The method according to claim 14 wherein said step of directing further comprises directing the received signal, along a selected fourth signal path, to an external radio frequency component that is connected to said switch.

18. The method according to claim 14 wherein said step of directing further comprises directing the received signal, along said selected third signal path, such that the first radio base station, when receiving the signal via the filter combiner, operates as a master radio base station, thereby feeding the second radio base station with the second signal.

* * * * *